Patented Mar. 14, 1939

2,150,789

UNITED STATES PATENT OFFICE 2,150,789

PROCESS FOR COATING CEMENTITIOUS SURFACES WITH METALLIC LAYERS

George S. Smith, Oakland, Calif.

No Drawing. Application July 25, 1933, Serial No. 682,108. Renewed January 19, 1938

4 Claims. (Cl. 91—68)

This invention relates to the surface coating or surface waterproofing of cementitious surfaces such as of concrete, walls, floors, cement, stucco, plaster, etc., as well as some other surfaces, and the object of the invention is to provide a fluid chemical mixture which includes a dust of the desired metal, in a form for application to the surface as by brushing or spraying, and which will normally react to produce or form a compound metallic film or layer in adherent relation to the surface. Other objects and advantages of the invention will appear in the following description.

Before describing the process, it should be clearly understood that it has nothing to do with the admixture with or incorporating into the body of the concrete or cement of any metallic salts, or powders such as powdered iron, etc., as heretofore suggested to produce a dense, or dense-surfaced concrete or cement to secure imperviousness, nor does it have anything to do with metallic paints such as aluminum paint, bronze and copper paints, or other paints carried in a binder which are applied and form their films by drying or hardening of the binder to mechanically lock the particles of metal and/or other pigmentous matter in place, for the main feature of the present invention is that a fluid mass is produced which after applying as a wet layer to the surface, chemically reacts with its metal constituents, and it is also thought with some of the elements of the surface, so that a substantially continuous metallic layer is produced as a result of the reaction, and which layer seems to finally consolidate with passage of time or after treatments, or both, until it virtually becomes a compound metallic sheet which cuts, files, and shows the physical characteristics of a layer of metal in tightly adherent contact with the cementitious surface upon which it was formed by the reaction set up. In some instances the chemical reaction involved creates considerable heat so that the surfaces become too hot to touch until the reaction subsides. Some features of the invention are, therefore, directed to the control of the reaction so that it will be more gradual and give better keeping qualities to the fluid mixture as well as more time for its proper application, the addition of silica or sodium silicate to the mixture being of particular value in this respect.

The basis of the invention is the use of a caustic alkali as a bonding ingredient in conjunction with a metal dust which will normally react therewith in an aqueous medium to form a compound metallic film.

The metals used include zinc, tin, lead, antimony, copper, bismuth, and others, as well as mixtures as of copper and zinc and/or tin, etc.

The formulas vary considerably though all rely on the fundamental reaction stated, but attention is here drawn to the fact that it is not merely a reaction such as between caustic soda and powdered zinc to form a zincate which is claimed, as sodium zincate is a soluble salt which would not form a usable film, but it is a reaction in presence of an excess or great excess of the metallic dust which produces a layer which gradually consolidates as the combined sodium becomes eliminated in some manner not clear, as it is admitted that the chemistry of the process is not clearly understood.

The various caustic alkalies seem to enter the reaction, particularly sodium hydroxide, also potassium hydroxide, and some results have been obtained with ammonia, but the sodium hydroxide seems to produce the best results.

The various metals tried, work better as they are more finely divided, and to secure good results must be in the form of a fine metal dust as free from oxide as commercially possible.

In some cases improved results have been found by subjecting the metal dust to attritive action as by running in a mill with marbles for a half hour to several hours, before using it in the process, as this makes it more active to enter the reaction, it is thought, through brightening it, or removing the oxidized surfaces perhaps.

The formulas are subject to considerable variation and, therefore, no limitation is implied by the following formulas which have produced satisfactory results with the various metals involved.

For a Zinc Coating

*Formula #1*

Aqueous solution sodium hydroxide, about 7 ounces by volume, preferably of about 15% strength.

Zinc dust, activated by grinding, about 30 ounces by weight.

Mix thoroughly and apply to the surface either by spraying or with a brush like paint, preferably using a brush of fine copper wires. It seems best to let the mixture stand for an hour or two before applying, especially if it contains silica as in some of the other formulas.

After setting undisturbed as applied for an hour or two a substantial film will be formed which will gradually unite after a few days into a substantially solid compound metallic layer which becomes tougher and more dense with the passage of time. Or in order to hasten the metallizing effect, the layer after an hour or two may be washed or bathed with an aqueous solution of zinc chloride from about 10% to saturated, or ferric chloride, or with any acid or with a salt of an acid which will form a hydroxide with the sodium hydroxide. When washed with zinc chloride it is thought that insoluble zinc hydroxide is formed and sodium chloride which washes off.

Formula #2

If the zinc powder is not reground or lacking in activity it suffices to add to each 100 ounces of the soda solution about ½ ounce of magnesium silica fluoride.

Formula #3

Solution A

| | Ounces |
|---|---|
| Water | 1000 |
| Sodium hydroxide | 150 |
| Lead chromate | 10 |
| Magnesium silica fluoride | 5 |

After dissolving add sufficient zinc dust (about 2.2 ounces plus or minus) to precipitate the lead content which is then filtered out or otherwise removed.

To make mixture

| Take of— | Ounces |
|---|---|
| Solution A about | 7 |
| Zinc dust about | 30 | mix thoroughly and apply.

Apply as per directions for Formula #1.

The lead chromate gives more keeping quality to the mixture. Chromium trioxide is probably formed in the solution, and may be added directly, but I prefer the method given. The magnesium silica fluoride tends to preserve fluidity to make application easier.

The use of silica, either in the form of sodium silicate or finely powdered pumice, with the zinc formula appears to retard the reaction, except if a very small quantity which appears to have a hardening action on the metallic film.

If the resulting zinc coating after setting as applied is bathed or washed with another bonding ingredient such as a saturated solution of zinc chloride, it hardens and metalizes the coating in less time. If washed with saturated solution of lead acetate either before or after washing with zinc chloride, a film of lead is deposited on top of the zinc coating.

In some cases I have found it an advantage to grind the zinc powder with a small amount of liquid mercury, a few drops to the pound, as this appears to have an activating effect.

After the compounded layer of zinc as applied has gradually changed by normal reaction into the metallic condition, a bathing or swabbing with a bonding ingredient of a strong solution of copper sulphate will deposit a bright layer of copper thereover causing a further coherence of metal particles.

The addition of copper dust to the zinc dust in the formula has already been touched upon.

While the thickness of the compound metallic layer finally produced will be in the neighborhood of $\frac{1}{64}$ or $\frac{1}{32}$ of an inch, it is possible by heaping the mixture on the surface to get films of metal $\frac{1}{16}$ or $\frac{1}{8}$ inch thick, but they are not so compact as gases are generated during the reaction either with the constituents of the mixture and/or with the cement constituents which can escape more readily from the thinner layers while in process of forming, though if heavier layers are wanted they may be built up from two or more thinner layers which appear to have perfect cohesion in most cases tried.

I have made perfect samples of metallic layers on cement surfaces with all of the above metals, and they are watertight, seem homogeneous, and may be filed and cut like the pure metal. I have also obtained good films on brick, wood, and other surfaces in some trials.

In view of the above disclosure, and the fact that there is nothing fixed about the formulas, I feel entitled to broad claims to what appears to be an improved way of producing a compound metallic waterproof and oil-proof coating on all manner of cementitious surfaces for use as produced, or for subsequent painting, or coating with other metals by electro-deposition or otherwise as may be desired for any use.

I therefore claim:

1. The process of producing a metallic coating on cementitious surfaces which comprises applying to the surface a mixture of a solution of a caustic alkali and zinc dust with the latter in excess of that required to form a zincate, and after the film has set applying a solution of an acid salt.

2. The process of producing a metallic coating on cementitious surfaces which comprises applying to the surface a mixture of a solution of a caustic alkali and zinc dust with the latter in excess of that required to form a zincate, and after the film has set applying a solution of a metal chloride.

3. The process of producing a metallic coating on cementitious surfaces which comprises applying to the surface a mixture of a solution of a caustic alkali and zinc dust with the latter in excess of that required to form a zincate, and after the film has set applying a solution of zinc chloride.

4. The process of producing a metallic coating on a cementitious surface which comprises applying to the surface a mixture of a solution of a caustic alkali and zinc dust with the latter in excess of that required to form a zincate, and after the film has set applying a solution of a salt.

GEORGE S. SMITH.